No. 873,440. PATENTED DEC. 10, 1907.
A. C. KERR.
KITCHEN CABINET.
APPLICATION FILED MAR. 1, 1907.
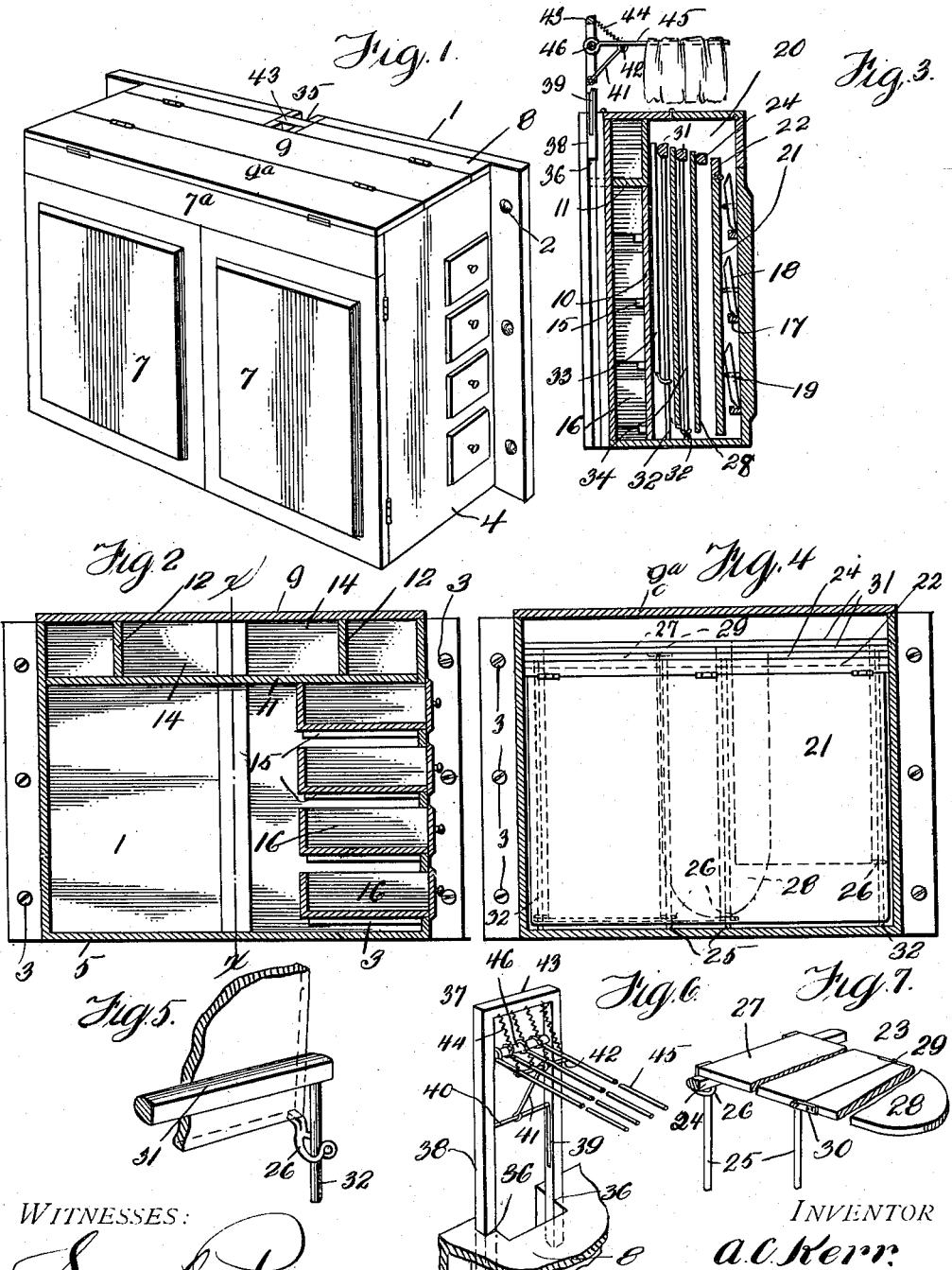
WITNESSES:
INVENTOR
A. C. Kerr.
BY
Attorneys

UNITED STATES PATENT OFFICE.

ADELAIDE C. KERR, OF TRAFFORD CITY, PENNSYLVANIA.

KITCHEN-CABINET.

No. 873,440.  Specification of Letters Patent.  Patented Dec. 10, 1907.

Application filed March 1, 1907. Serial No. 360,038.

*To all whom it may concern:*

Be it known that I, ADELAIDE C. KERR, a citizen of the United States of America, residing at Trafford City, in the county of Westmoreland and State of Pennsylvania, have invented certain new and useful Improvements in Kitchen-Cabinets, of which the following is a specification, reference being had therein to the accompanying drawing.

This invention relates to a kitchen cabinet, and the invention has for its primary object to provide a novel cabinet having folding boards adapted to be used for various purposes, a plurality of compartments for housing cooking utensils and culinary articles, and a novel rack for supporting various cloths used for cleansing purposes in a kitchen or culinary department.

Another object of this invention is to provide a cabinet which will neatly house the above mentioned articles whereby easy access can be had to either of said articles, without disturbing the other articles housed by said cabinet.

With the above and other objects in view, which will more readily appear as the invention is better understood, the same consists in the novel construction, combination and arrangement of parts to be hereinafter more fully described and then specifically pointed out in the appended claims.

Referring to the drawing forming part of this specification, like numerals of reference designate corresponding parts throughout the several views, in which:

Figure 1 is a perspective view of my improved cabinet, Fig. 2 is a longitudinal sectional view of the same, Fig. 3 is a cross sectional view of the cabinet, taken on the line $x$—$x$ of Fig. 2, but illustrating the cloth-supporting rack withdrawn from the cabinet. Fig. 4 is a longitudinal sectional view of the cabinet, illustrating the working boards thereof in elevation, Fig. 5 is a detail perspective view of a portion of the cabinet illustrating the manner in which working boards are hinged. Fig. 6 is a perspective view of the cloth supporting rack withdrawn from the cabinet. Fig. 7 is a fragmentary perspective view of one of the working boards of said cabinet.

To put my invention into practice, I construct my improved cabinet of a base or rear board 1 provided at its ends with openings 2, whereby said cabinet can be secured to a wall or suitable support by screws 3. The base or rear board 1 is provided with end walls 4 and a bottom board 5. The front wall is formed by hinged doors 7 and $7^a$. The top of the cabinet is closed by a board 8 and hinged doors 9 and $9^a$, the latter carrying the front hinged door $7^a$, said doors 9 and $9^a$ together with the board 8 forming a horizontal shelf or table upon which utensils or similar articles can be placed.

The cabinet is provided near its base or rear board 1 with a vertically disposed partition 10, said partition together with partitions 11 and 12 forming a plurality of compartments 14 at the top and rear side of the cabinet for culinary instruments or similar articles. The partition 10 beneath said compartments and at one end of the cabinet is provided with cleats 15 forming guide ways for drawers 16, said drawers being adapted for spices and similar seasoning ingredients used in culinary departments.

The hinged doors 7 upon their inner sides are provided with brackets 17 for holding pans 18 and similar cooking utensils, the upper parts of said utensils being held by straps 19 carried by said doors.

The compartment 20 within the cabinet, between the partition 10 and the front wall of said cabinet is adapted to contain various working boards. A general working board 21 is hinged to a bar 22 arranged within the compartment 20, said general working board having its outer ends suitably supported when the doors 7 are open and the board swung upwardly upon a horizontal plane. A conventional form of bolt located upon the inner top edge of the door can be used for firmly supporting the outer end of the general working board, said bolt engaging in a suitable socket secured to said board. A two-part ironing board 23 is supported from a transverse bar 24 arranged within the compartment 20. The bar 24 is provided with depending guide rods 25, and upon said rods are adapted to slide curved loops 26 carried by the part 27 of the ironing board, the outer part 28 of said board being hinged to the part 27, as at 29, and held in an extended position by a clasp 30 carried by the edge of the part 28 opposite the hinge 29. When the ironing board is folded within the cabinet, the parts 27 and 28 lie side by side, but when the ironing board is used, the parts lie end to end. The curved loops 26 are adapted to support the ironing board upon the bar 24, to permit of said ironing board being lowered to the vertically disposed position illustrated in Fig. 3 of the drawings.

The compartment 20 is provided with transverse bars 31 having depending guide rods 32 adapted to guide and support boards 33 and 34, these boards being pivoted and swung outwardly upon a horizontal plane, when it is desired to use either of said boards. One of said boards is used as a bread board while the other of said boards is preferably made of maple wood and used as a meat board. It will of course be understood that when the various boards of the cabinet are to be used, the hinged doors 9, 9ª and 7ª are open to permit of the boards being horizontally positioned with relation to the cabinet.

The base or rear board 1 of the cabinet is cut away as at 35, and constructed to provide two guide ways 36 for a movable rack 37. The side arms 38 of said rack are grooved as at 39 and arranged within said confronting grooves is a rod 40, which connects by a link 41 with a rod 42 said rod being connected to the cross head 43 of the rack by retractile springs 44. The springs 44 are adapted to hold the rod 42 in a horizontal position to support a plurality of outwardly extending rods 45 pivotally connected to a bar 46 carried by the side arms 38 of the rack 37. When the rack is to be placed within the cabinet, the outwardly extending rods 45 are lowered, placing the springs 44 under tension, and then the rack in its entirety is moved downwardly within the cabinet. The weight of the various cloths suspended from the extending bars 45 is adapted to frictionally hold the rack 37 within the guide ways 36 and prevent the rack from descending into the cabinet while the same is being used.

From the foregoing description taken in connection with the drawing, it will be observed that I have devised a novel cabinet for supporting the various working boards of a kitchen or culinary department, also providing various compartments and receptacles and a novel collapsible rack.

The cabinet is preferably constructed of wood and can be suitably ornamented to present a neat and attractive appearance.

It is obvious that various changes may be made in the arrangement of the various parts of my improved cabinet without departing from the spirit and scope of the invention as defined by the appended claims.

What I claim and desire to secure by Letters Patent, is:—

1. A kitchen cabinet consisting of a rear board having guide ways, a collapsible rack slidably mounted in said guide ways, end walls carried by said board, hinged doors carried by said end walls, dish racks carried by said doors, partitions arranged between said end walls and forming a plurality of compartments, drawers slidably mounted between said board and one of said partitions, hinged doors forming the top and a portion of the front of said cabinet, a plurality of working boards mounted in said cabinet and adapted to be supported in an extended position from said cabinet.

2. A kitchen cabinet consisting of a board, end walls carried thereby, hinged front doors carried by said end walls, partitions arranged between said end walls and providing a plurality of compartments, drawers slidably mounted between said board and one of said partitions, hinged doors forming the top and a portion of the front of said cabinet, a collapsible rack movably supported within said cabinet, a two-part ironing board mounted within said cabinet, and a plurality of working boards mounted in said cabinet, and means to support said boards in an extended position from said cabinet.

3. A kitchen cabinet comprising a rear board, end walls carried thereby, hinged front doors carried by said end walls, partitions arranged between said end walls and providing a plurality of compartments, drawers slidably mounted between said board and one of said partitions, hinged doors forming the top and a portion of the front of said cabinet, a two-part ironing board mounted within said cabinet, a plurality of working boards pivotally mounted in said cabinet normally resting in a vertical position within the cabinet and adapted to be swung on their pivots and supported in a horizontal position, and means to support said boards in an extended position from said cabinet.

4. In a kitchen cabinet, a rear board, end walls carried thereby, partitions arranged between said end walls and providing a plurality of compartments, a plurality of hinged sections forming the top of the cabinet and one of which sections overlies and forms a part of the front of said cabinet, a pair of doors hinged to the end walls and constituting the remainder of the front of the cabinet, and a plurality of working-boards disposed to rest normally in a vertical position within the cabinet and adapted to be elevated vertically therefrom and supported in horizontal position with respect to the cabinet, and means for supporting said working-boards in horizontal position.

5. In a kitchen cabinet, a rear board, end walls carried thereby, a top composed of a plurality of sections hinged together, a front embodying a pair of boards hinged to the end walls, a supporting bar arranged within the cabinet near the upper end thereof, and provided adjacent each end with a depending guide rod, a working-board provided with loops engaging said guide rod, and means for supporting said working-board when extended from the cabinet in a horizontal position.

6. In a kitchen cabinet, a rear board, end walls connected thereto, hinged doors forming the front, a bottom, and a plurality of hinged sections forming the top, a plurality of supporting bars arranged within the cabinet near the upper end thereof and provided near each end with depending guide rods, a plurality of working-boards each provided with loops engaging said guide rods adapted to be elevated vertically from the cabinet when the top thereof is opened and disposed in a horizontal position with respect to the cabinet, and means for supporting said working-boards in said horizontal position.

In testimony whereof I affix my signature in the presence of two witnesses.

ADELAIDE C. KERR.

Witnesses:
   Max H. Srolovitz,
   Flora Miller.